US 12,358,552 B2

(12) United States Patent
Hamamoto et al.

(10) Patent No.: US 12,358,552 B2
(45) Date of Patent: Jul. 15, 2025

(54) ELECTRIC POWER STEERING DEVICE

(71) Applicant: HONDA MOTOR CO., LTD., Tokyo (JP)

(72) Inventors: Kyoji Hamamoto, Tokyo (JP); Takashi Kuribayashi, Tokyo (JP); Seigo Murashige, Tokyo (JP); Hirohito Ide, Tokyo (JP); Hideki Imafuku, Tokyo (JP); Ryoto Teranishi, Tokyo (JP); Ryuhei Miyoshi, Tokyo (JP); Yuki Mano, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 694 days.

(21) Appl. No.: 17/592,715

(22) Filed: Feb. 4, 2022

(65) Prior Publication Data
US 2022/0250674 A1     Aug. 11, 2022

(30) Foreign Application Priority Data

Feb. 9, 2021   (JP) .................. 2021-018816

(51) Int. Cl.
  *B62D 5/04*   (2006.01)
  *H02J 7/00*   (2006.01)
  *H02J 9/06*   (2006.01)
(52) U.S. Cl.
  CPC ...... *B62D 5/0484* (2013.01); *H02J 7/007182* (2020.01); *H02J 9/06* (2013.01)
(58) Field of Classification Search
  CPC .......... B62D 5/0484; B62D 5/04; B62D 6/00; H02J 7/007182; H02J 9/06
  See application file for complete search history.

(56) References Cited

U.S. PATENT DOCUMENTS

| | | | |
|---|---|---|---|
| 6,580,989 B1 | 6/2003 | Husain et al. | |
| 8,504,247 B2 * | 8/2013 | Yamashita | B62D 5/0481 180/443 |

(Continued)

FOREIGN PATENT DOCUMENTS

| | | |
|---|---|---|
| CN | 106004995 A | 10/2016 |
| CN | 107399366 A | 11/2017 |

(Continued)

OTHER PUBLICATIONS

Chinese Office Action dated Feb. 29, 2024, Application No. 202210020082.0; 8 pages.

(Continued)

*Primary Examiner* — Valentin Neacsu
*Assistant Examiner* — Michael R Stabley
(74) *Attorney, Agent, or Firm* — Rankin, Hill & Clark LLP (57) ABSTRACT

Provided is an electric power steering device including: a motor; a drive device that supplies the motor with three-phase alternating current electric power; and a control device that controls the drive device, in which the control device is connected to a first power supply path that supplies power to the control device not via an ignition switch and a second power supply path that supplies power to the control device via the ignition switch, and the control device, in a case of detecting a failing of the first power supply path, operates with power supplied from the second power supply path and makes the motor generate an electromagnetic brake.

7 Claims, 4 Drawing Sheets

(56) References Cited

U.S. PATENT DOCUMENTS

| | | | |
|---|---|---|---|
| 9,327,759 B2* | 5/2016 | Yamamoto | H02P 6/24 |
| 11,377,146 B2* | 7/2022 | Fujimoto | B62D 5/006 |
| 2016/0339949 A1* | 11/2016 | Mori | H02P 29/032 |
| 2017/0313349 A1 | 11/2017 | Sugiyama | |
| 2018/0001924 A1 | 1/2018 | Imaizumi et al. | |
| 2018/0148088 A1 | 5/2018 | Katayama et al. | |
| 2020/0269913 A1* | 8/2020 | Fujimoto | B62D 5/0484 |
| 2021/0253157 A1 | 8/2021 | Hamori et al. | |

FOREIGN PATENT DOCUMENTS

| | | |
|---|---|---|
| CN | 107531271 A | 1/2018 |
| CN | 108116488 A | 6/2018 |
| CN | 209241164 U | 8/2019 |
| CN | 112334376 A | 2/2021 |
| JP | H09-290762 | 11/1997 |
| JP | 2009-274475 A | 11/2009 |
| JP | 2015-168336 A | 9/2015 |
| JP | 2020-138554 A | 9/2020 |

OTHER PUBLICATIONS

Japanese Office Action dated Aug. 2, 2022 issued in corresponding Japanese application No. 2021-018816; English translation included (7 pages).

* cited by examiner

ELECTRIC POWER STEERING DEVICE

INCORPORATION BY REFERENCE

The present application claims priority under 35 U.S.C. § 119 to Japanese Patent Application No. 2021-018816 filed on Feb. 9, 2021. The content of the application is incorporated herein by reference in its entirety.

BACKGROUND OF THE INVENTION

Field of the Invention

The present invention relates to electric power steering devices.

Description of the Related Art

For electric power steering devices for vehicles, there is known a technique in which when an abnormal event or the like occurs in a sensor while an auxiliary steering torque is being generated, the terminals of the motor are short-circuited with each other for a specified time to stop the motor (for example, see Japanese Patent Laid-Open No. H9-290762). According to the electric power steering device described in Japanese Patent Laid-Open No. H9-290762, when the motor is stopped, the force seeking to return the steering handle to its neutral position is suppressed.

SUMMARY OF THE INVENTION

However, in the case in which an abnormal event that causes the power supply to fail occurs in a vehicle, the electric power steering device cannot be controlled, and thus it is impossible to stabilize the steering of the vehicle by using the electromagnetic brake as described above. For example, in the case in which an abnormal event occurs in an electric power steering device when the electric power steering is automatically being steered by a travel assistance system mounted on the vehicle, and the driver is not holding the steering handle, what is called, in the state of hands-off, it is possible that the vehicle may move in an unintended direction during the period until the driver holds the steering handle. Hence, a technique has been desired that makes it possible to keep the control device of the electric power steering device operable even when an abnormal event occurs in the vehicle.

The present invention has been made in light of the background above, and an object thereof is to provide an electric power steering device that makes it possible to suppress the movement of the vehicle in an unintended direction even in the case in which the power supply of the vehicle fails when the driver is not operating the vehicle.

A first aspect to achieve the above object is an electric power steering device including: a motor; a drive device that supplies the motor with three-phase alternating current electric power; and a control device that controls the drive device, in which the control device is connected to a first power supply path that supplies power to the control device not via an ignition switch and a second power supply path that supplies power to the control device via the ignition switch, and the control device, in a case of detecting a failing of the first power supply path, operates with power supplied from the second power supply path and makes the motor generate an electromagnetic brake.

The above electric power steering device may have a configuration in which the first power supply path has a circuit that connects the control device to a battery of a vehicle.

The above electric power steering device may have a configuration in which the drive device is connected to the battery of the vehicle together with the circuit of the first power supply path and supplies electric power to the motor, and the control device, in a case of detecting a failing of the first power supply path, short-circuits the motor to generate an electromagnetic brake.

The above electric power steering device may have a configuration in which the control device compares supply voltages of the first power supply path and the second power supply path, and when the difference between the supply voltages is larger than or equal to a preset voltage value, the control device detects a failing of the first power supply path.

The above electric power steering device may have a configuration in which in a case in which a specified time elapses after the motor generates an electromagnetic brake, the drive device makes the motor release the electromagnetic brake.

The above electric power steering device may have a configuration in which the electric power steering device further includes a detection unit that detects a holding operation to a steering handle, and in a case in which the control device detects a holding operation to the steering handle while the motor is operating an electromagnetic brake, the control device makes the motor release the electromagnetic brake.

The above electric power steering device may have a configuration in which the electric power steering device further includes a detection unit that detects a holding operation to a steering handle, and in a case in which the control device detects a failing of the first power supply path in a state in which the control device is detecting a holding operation to the steering, the control device does not make the motor generate an electromagnetic brake.

The above electric power steering device may have a configuration in which in a case in which the control device detects a failing of the first power supply path, the control device performs notification control to make a notification prompting a holding operation to a steering handle.

The above configurations make it possible to control the electric power steering device even when the power supply of the vehicle fails, by using the power supply via the ignition switch.

DETAILED DESCRIPTION OF THE PREFERRED EMBODIMENTS

1. Configuration of Electric Power Steering Device

Figure 1:
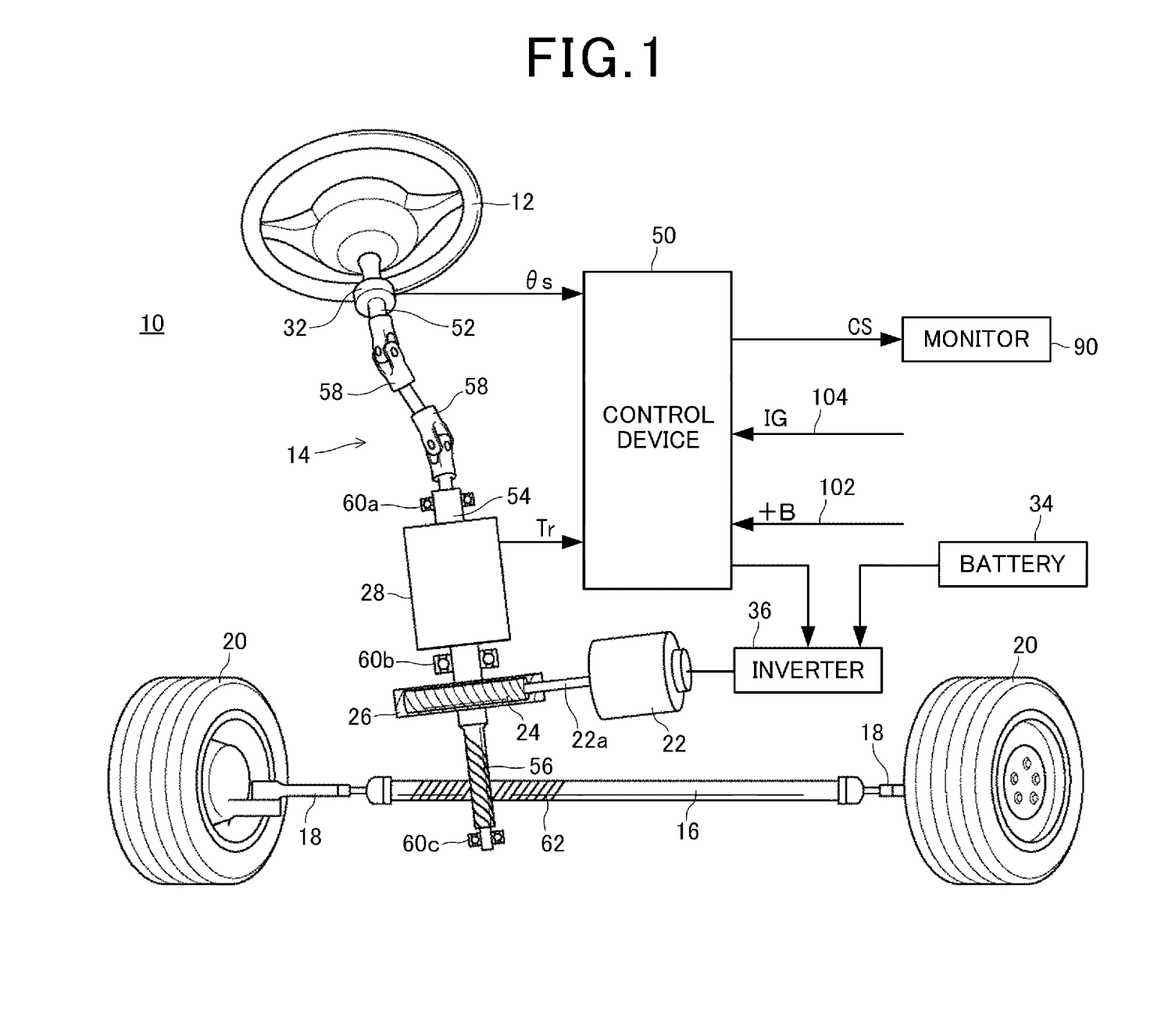
FIG. 1 is a schematic configuration diagram of an electric power steering device.
Figure 2:
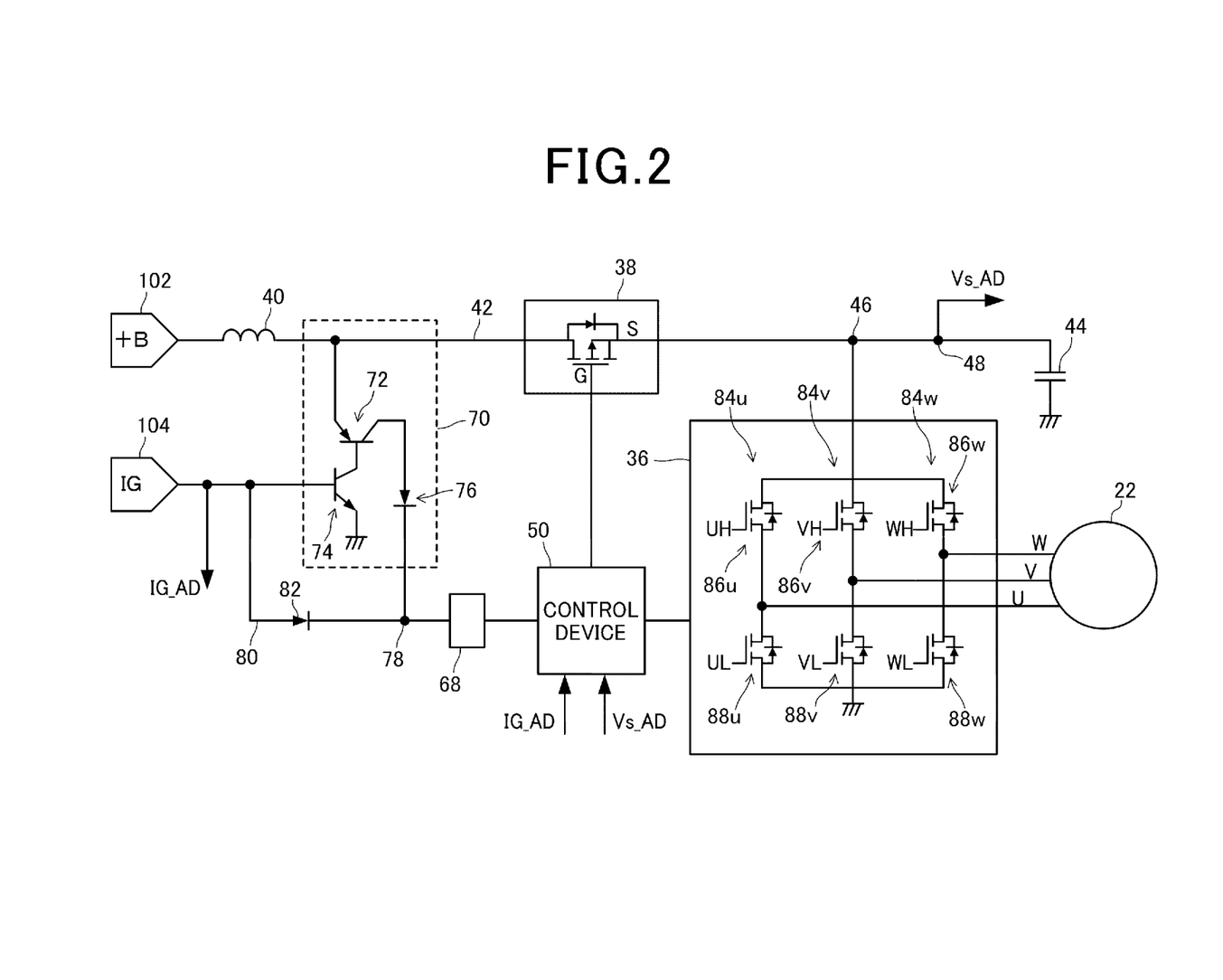
FIG. 2 is a diagram illustrating a circuit configuration of an important part of the electric power steering device.

FIG. 1 is a schematic configuration diagram of a power steering device 10 according to an embodiment of the present invention. FIG. 2 is a diagram illustrating the circuit configuration of an important part of the power steering device 10.

The power steering device 10 is mounted on a vehicle and steers the vehicle. The following describes the power steering device 10 mounted on a four-wheeled automobile as an example. The power steering device 10 includes a steering handle 12 (steering wheel) that the driver of the vehicle operates. The power steering device 10, in response to the steering handle 12 being operated, generates an assistance torque by using a motor 22 described later to assist the steering by the driver. The power steering device 10 is also automatically controlled based on instructions from a travel assistance ECU included in a travel assistance system mounted on the vehicle. The travel assistance system, when operating, controls the torque of the motor such that the steering angle is equal to the target steering angle, based on the target steering angle according to the instruction from the travel assistance ECU, the detection value of a steering-angle sensor, and the detection value of a vehicle speed sensor. The travel assistance system enables traveling in the state of what is called hands-off in which the driver is not holding the steering handle 12, by executing the steering exceeding the amount of operation of the steering handle 12 by the driver and the steering not by the operation of the steering handle 12.

As illustrated in FIG. 1, the power steering device 10 includes the steering handle 12, a steering shaft 14, a rack shaft 16, tie rods 18, and right and left front wheels 20 which are the wheels to be steered. The steering shaft 14, the rack shaft 16, and the tie rods 18 compose a manual steering system. The manual steering system directly transmits the steering operation of the steering handle 12 by the driver to the front wheels 20.

A description will be given of the configuration of the manual steering system.

The steering shaft 14 includes a main steering shaft 52 integrally connected to the steering handle 12, a pinion shaft 54 provided with a pinion 56 of the rack and pinion mechanism, and a universal joint 58 that connects the main steering shaft 52 and the pinion shaft 54.

The pinion shaft 54 is supported at its upper portion, intermediate portion, and lower portion by the bearings 60a, 60b, and 60c, and the pinion 56 is provided at the lower end of the pinion shaft 54. The pinion 56 engages with the rack teeth 62 of the rack shaft 16 which is capable of reciprocating in the vehicle-width direction.

The rotational force generated by the operation of the steering handle 12 by the driver, in other words, the steering torque Tr is transmitted to the pinion shaft 54 via the main steering shaft 52 and the universal joint 58. The steering torque Tr is converted to a thrust force by the pinion 56 of the pinion shaft 54 and the rack teeth 62 of the rack shaft 16, and this thrust force moves the rack shaft 16 in the vehicle-width direction. Along with the displacement of the rack shaft 16, the tie rods 18 steer the front wheels 20, changing the orientation of the vehicle.

The power steering device 10 includes the motor 22, a worm gear 24, a worm wheel gear 26, a torque sensor 28, the steering-angle sensor 32, an inverter 36, and a control device 50. The inverter 36 is connected to a battery 34 mounted on the vehicle.

The motor 22, the worm gear 24, and the worm wheel gear 26 compose an assist drive system. The assist drive system generates the steering assist force that assists the steering of the driver. The torque sensor 28, the steering-angle sensor 32, the inverter 36, and control device 50 compose an assist control system. The assist control system controls the assist drive system.

A description will be given of the assist drive system.

The motor 22 is connected to the rack shaft 16 via the worm gear 24 and the worm wheel gear 26. In other words, the output shaft 22a of the motor 22 is connected to the worm gear 24. The worm wheel gear 26 that engages with the worm gear 24 is formed on the pinion shaft 54, and the pinion shaft 54 is connected to the rack shaft 16.

The motor 22 of the present embodiment is of a three-phase AC brushless type. The motor 22 is provided with electric power from the battery 34 via the inverter 36 controlled by the control device 50. The motor 22 generates driving force according to the electric power supplied by the inverter 36. The driving force of the motor 22 is transmitted to the rack shaft 16 via the output shaft 22a, the worm gear 24, and the pinion shaft 54. The driving force of the motor 22 acts as steering assist force, which assists the steering of the driver.

The torque sensor 28 included in the assist control system is provided between the bearing 60b at an intermediate portion of the pinion shaft 54 and the bearing 60a at an upper portion of the pinion shaft 54. The torque sensor 28 detects the steering torque Tr based on the change in the magnetic characteristic caused by the magnetostriction and outputs it to the control device 50.

The steering-angle sensor 32 detects the steering angle θs of the steering handle 12 and outputs it to the control device 50.

The steering torque Tr and the steering angle θs are used for feedforward control in the control device 50.

The inverter 36 has a three-phase full bridge configuration. The inverter 36 converts the direct current from the battery 34 into a three-phase alternating current by DC/AC conversion and supplies it to the motor 22. The inverter 36 corresponds to an example of a drive device.

As illustrated in FIG. 2, the inverter 36 has three-phase phase arms 84u, 84v, and 84w. The U phase arm 84u includes an upper arm device 86u and a lower arm device 88u. Each of the upper arm device 86u and the lower arm device 88u includes a switching device composed of a MOSFET or an IGBT, and a diode.

Similarly, the V phase arm 84v includes an upper arm device 86v and a lower arm device 88v, and the W phase arm 84w includes an upper arm device 86w and a lower arm device 88w. Each of the arm devices included in the V phase arm 84v and the W phase arm 84w is composed of a combination of a switching device composed of a MOSFET or an IGBT, and a diode.

The upper arm devices 86u, 86v, and 86w are driven by drive signals UH, VH, and WH from the control device 50. The lower arm devices 88u, 88v, and 88w are driven by drive signals UL, VL, and WL from the control device 50.

The midpoint of the U phase arm 84u is connected to the U phase of the motor 22, the midpoint of the V phase arm 84v is connected to the V phase of the motor 22, and the midpoint of the W phase arm 84w is connected to the W phase of the motor 22.

The inverter 36 supplies three-phase alternating current to the motor 22 to rotate the motor 22 by each arm device switching according to the drive signals UH, VH, WH, UL, VL, and WL outputted by the control device 50.

The control device 50 includes a processor and memory that stores data that the processor processes. Specifically, the control device 50 includes a micro controller, a CPU, an MPU, or the like. The control device 50 implements various functions, for example, by the processor executing programs. The control device 50 may be hardware in which the functions of the control device 50 are programed.

The control device 50 is capable of generating an electromagnetic brake on the motor 22 by controlling the inverter 36. The control device 50 opens all the upper arm devices 86$u$, 86$v$, and 86$w$ of the inverter 36 and short-circuits all the lower arm devices 88$u$, 88$v$, and 88$w$ to the ground. In this state, the motor 22 stops rotating and in addition, puts a brake on external force that seeks to rotate the output shaft 22$a$. In other words, the motor 22 stops the rotation of the pinion 56 via the output shaft 22$a$, the worm gear 24, and the worm wheel gear 26. This locks the power steering device 10 and restrains the steering of the front wheels 20, and thus, it is possible to prevent or suppress a sudden change in the behavior of the vehicle caused by input from the contact surface of the front wheels 20 with the ground.

2. Supply of Electric Power to Control Device

Here, a description is given of a configuration for supplying electric power to the control device 50.

The power steering device 10 is connected, as the power supply for the control device 50, to a +B power supply 102 leading to the main power supply of the vehicle and to an ignition power supply (hereinafter referred to as an IG power supply) 104.

The +B power supply 102 is connected to the battery 34 via a not-illustrated fuse. The battery 34 is connected to a power generation device or the like included in the vehicle. Specifically, in a vehicle having an engine of an internal combustion mechanism, a circuit including a generator driven by the engine is connected to the battery 34. In a vehicle having a battery for driving, the battery for driving is connected to the battery 34 via a circuit including a voltage conversion circuit. The +B power supply 102 is connected to the battery 34, and the foregoing circuit that supplies power to the battery 34.

The IG power supply 104 is supplied via the ignition switch of the vehicle. The ignition switch is connected to the battery 34 via, for example, an ignition relay.

As illustrated in FIG. 2, the +B power supply 102 is connected to a power supply line 42 via a choke coil 40. The power supply line 42 is connected to the upper arm devices 86$u$, 86$v$, and 86$w$ of the inverter 36. The inverter 36 drives the motor 22 by using the electric power supplied from the power supply line 42. The power supply line 42 is connected to the ground via a capacitor 44.

The power supply line 42 has an FET 38 for protection against reverse connection. The FET 38 is disposed between the choke coil 40 and a node 46 to which the inverter 36 is connected. The gate of the FET 38 is connected to the control device 50. The control device 50 turns on and off the FET 38 to cut off the current that flows from the inverter 36 to the +B power supply 102 during the operation of the inverter 36.

The control device 50 is connected to a first power supply path 70 and a second power supply path 80 via a regulator 68. The first power supply path 70 includes a switching device 72 connected to the power supply line 42, a switching device 74, and a diode 76. The switching device 74 is connected to the IG power supply 104, and when the voltage of the IG power supply 104 exceeds a threshold, the switching device 74 turns on, which turns on the switching device 72. With this operation, electric current flows from the power supply line 42 to the regulator 68 via the switching device 72 and the diode 76, and thus electric power is supplied to the control device 50.

The second power supply path 80 is connected to the IG power supply 104. The second power supply path 80 has a diode 82. In other words, the IG power supply 104 and the regulator 68 are connected via the diode 82. The first power supply path 70 is connected to a node 78 between the diode 82 and the regulator 68. Thus, because of the potential difference between the +B power supply 102 and the IG power supply 104, while electric current is flowing from the first power supply path 70 to the regulator 68, electric current does not flow from the second power supply path 80 to the control device 50. In the state in which electric current is not flowing from the first power supply path 70 to the regulator 68, and the IG power supply 104 is on, electric current flows from the second power supply path 80 to the regulator 68. Thus, the second power supply path 80 is a bypass feeder circuit that supplies electric power to the control device 50 in the case in which the +B power supply 102 fails.

The failing of the +B power supply 102 includes not only the state in which the supply from the +B power supply 102 is completely stopped but also the state in which power cannot be supplied normally from the +B power supply 102 to the control device 50. For example, it includes a case in which the +B power supply 102 is cut off and the case in which the voltage of the +B power supply 102 is lower than or equal to a specified value.

In the vehicle having the power steering device 10, the +B power supply 102 fails in the case in which the power supply line through which electric power is supplied from the battery 34 to the power steering device 10 is short-circuited or opened. In this case, a problem occurs in the supply itself from the +B power supply 102 to the power steering device 10. In addition, the +B power supply 102 fails in the case in which separation at the connection portions of circuit devices such as the choke coil 40 occurs in the power steering device 10, in the case in which a short circuit of the capacitor 44 occurs, or in other cases. In these cases, although the +B power supply 102 is supplied to the power steering device 10, power cannot be supplied from the first power supply path 70 to the control device 50. In any of these cases, the control device 50 determines that the +B power supply 102 has failed.

When the +B power supply 102 fails, the supply of electric power from the first power supply path 70 to the control device 50 stops. In the case in which the +B power supply 102 fails, the power steering device 10 of the present embodiment can supply electric power to the control device 50 through the second power supply path 80. With this configuration, the control device 50 can control the inverter 36 to generate an electromagnetic brake on the motor 22 and thus can prevent or suppress a sudden change in the vehicle orientation.

In the case in which the +B power supply 102 fails, the motor 22 cannot generate assistance torque because the power supply to the inverter 36 is lost. Even in this case, the control device 50 can generate an electromagnetic brake on the motor 22 by short-circuiting the lower arm devices 88$u$, 88$v$, and 88$w$. The electromagnetic brake gives resistance against input from the road surface to the front wheels 20 and the return force to steering and suppresses a sudden change in the vehicle orientation.

If the driver is holding the steering handle 12 when the +B power supply 102 fails, the driver can operate the steering handle 12 to stabilize the vehicle. On the other hand, if the +B power supply 102 fails in the state in which the travel assistance system is operating, and the driver is not holding the steering handle 12, what is called, in the state of hands-off, it is possible that the driver's operation may not be in time. Specifically, in the hands-off state, by the time when the driver holds the steering handle 12 to take an action against the failing of the power supply, the steering state of the power steering device 10 can change along with the traveling of the vehicle. With the power steering device 10 of the present embodiment, during the period from the time when the +B power supply 102 fails and until the driver holds the steering handle 12, a sudden change in the vehicle orientation can be suppressed by generating an electromagnetic brake.

The configuration using the second power supply path 80 in addition to the first power supply path 70 as a power supply of the control device 50 has an advantage in that it does not make the vehicle heavier or larger, for example, than the case in which a new battery is mounted on the vehicle as a backup power supply of the +B power supply 102.

3. Detection of Failing of Power Supply

A description will be given of detection of the failing of the +B power supply 102.

As illustrated in FIG. 2, the control device 50 receives input of Vs_AD and IG_AD. Vs_AD is the analog value of the voltage of the +B power supply 102 and is detected, for example, at a node 48 between the FET 38 and the capacitor 44. IG_AD is the analog value of the voltage of the IG power supply 104 and is detected, for example, at a portion between the IG power supply 104 and the second power supply path 80. Vs_AD corresponds to the supply voltage of the first power supply path 70, and IG_AD corresponds to the supply voltage of the second power supply path 80.

The control device 50 compares Vs_AD and IG_AD, and when the difference between Vs_AD and IG_AD is larger than a preset threshold, the control device 50 detects the failing of the +B power supply 102. With this method, it is possible to reliably detect the failing of the +B power supply 102 caused by, for example, separation at a joint portion of the choke coil 40 or a short circuit of the capacitor 44.

The control device 50 may detect the failing of the +B power supply 102 based on the leak resistance between the gate and source of the FET 38. For example, in the case in which the short circuit of the capacitor 44 occurs, the leak current that flows when the gate of FET 38 is off becomes large. The control device 50 can detect an increase in the leak current to detect a short circuit of the capacitor 44 and determine that the +B power supply 102 has failed.

4. Operation of Control Device

A description will be given of the operation of the control device 50. The following description illustrates an example in which a method is employed in which IG_AD and Vs_AD are compared as the operation of the control device 50 to determine the failing of the +B power supply 102.

Figure 3:
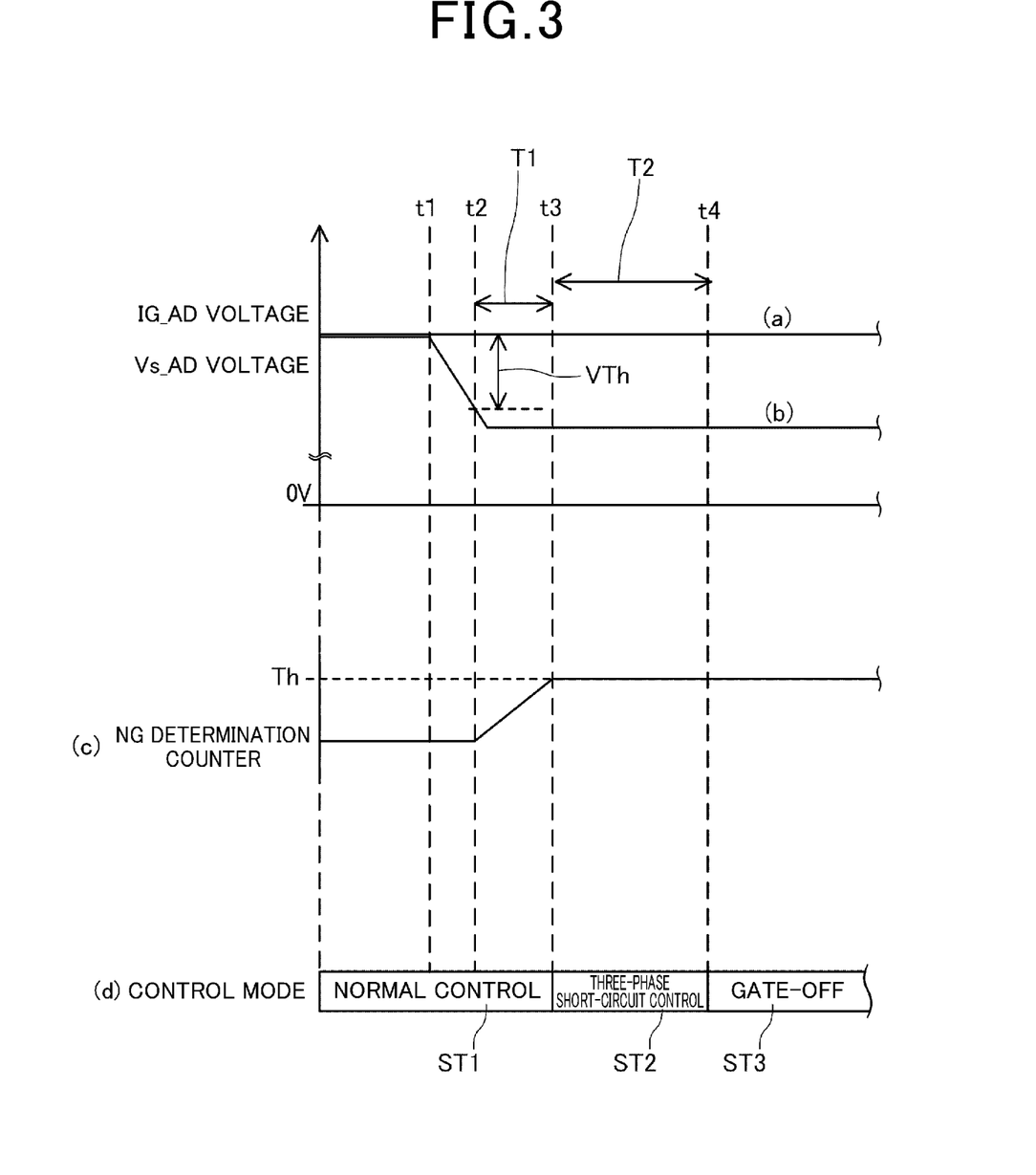
FIG. 3 is an explanatory diagram illustrating operation of the electric power steering device.

FIG. 3 is an explanatory diagram to illustrate the operation of the power steering device 10. FIG. 3 shows changes in the following items with time: (a) IG_AD voltage, (b) Vs_AD, and (c) the value of an NG determination counter of the control device 50. FIG. 3 also shows changes of (d) the control mode of the control device 50.

The NG determination counter is a function of counting time after the control device 50 detects a fall of Vs_AD. The count value of the NG determination counter indicates the time elapsed since a fall of Vs_AD is detected. When the count value of the NG determination counter reaches a preset threshold Th, the control device 50 determines that the +B power supply 102 failed.

FIG. 3 shows, as the control mode of the control device 50, a normal operation mode ST1 which is executed during the normal operation of the power steering device 10, a three-phase short-circuit control ST2 in which the lower arm devices 88*u*, 88*v*, and 88*w* of the inverter 36 are short-circuited, and a gate-off mode ST3. The three-phase short-circuit control ST2 is a control mode in which the electromagnetic brake of the motor 22 is operated. The gate-off mode ST3 is a control mode in which the electromagnetic brake of the motor 22 is released. In the gate-off mode ST3, the control device 50 turns off the lower arm devices 88*u*, 88*v*, and 88*w* of the inverter 36.

When the +B power supply 102 and the IG power supply 104 are in their normal states, the difference between IG_AD and Vs_AD is small. When an abnormal event occurs in the +B power supply 102 (time t1), Vs_AD falls. When the difference between IG_AD and Vs_AD reaches the threshold VTh (time t2) because of the fall of Vs_AD, the control device 50 starts counting with the NG determination counter. When the count value of the NG determination counter reaches the preset threshold Th (time t3), the control device 50 determines that the +B power supply 102 has failed. The control device 50 switches the control mode to the three-phase short-circuit control ST2. The control device 50 executes the three-phase short-circuit control ST2 only for a preset set time T2, and after that, at time t3, the control device 50 switches the control mode to the gate-off mode ST3.

As described above, when the time T1 elapses after the difference between Vs_AD and IG_AD reaches the threshold VTh, the control device 50 executes the three-phase short-circuit control ST2 to generate an electromagnetic brake. The control device 50 keeps the electromagnetic brake for the set time T2, and after that, releases the electromagnetic brake. When the control device 50 releases the electromagnetic brake in the gate-off mode ST3, the manual steering using the steering handle 12 is made possible. As described above, the control device 50 operates the electromagnetic brake only for the set time T2 after the failing of the +B power supply 102 occurs, and after that, it releases the electromagnetic brake. This operation suppresses a sudden change in the vehicle orientation until the driver starts operating the steering handle 12, and after that, the electromagnetic brake is released so that it will not interfere the operation of the driver.

Figure 4:
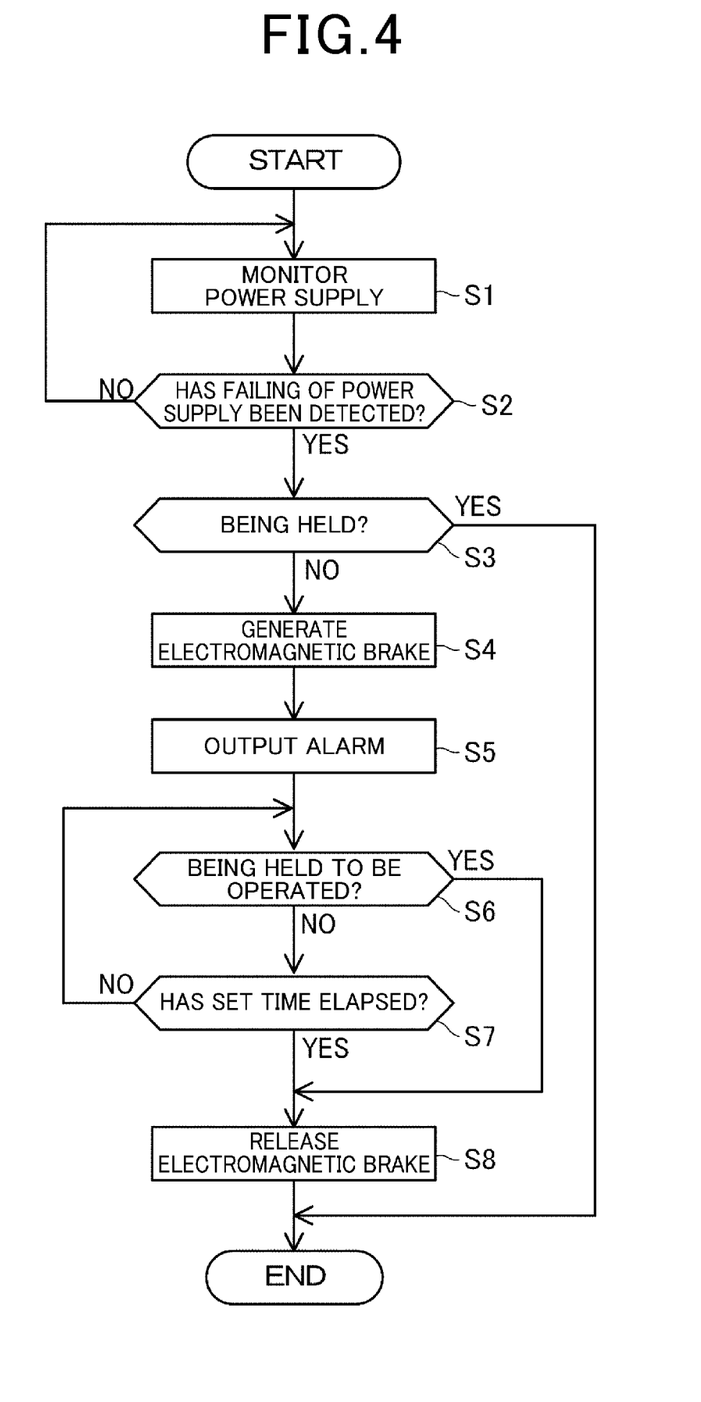
FIG. 4 is a flowchart illustrating operation of the electric power steering device.

FIG. 4 is a flowchart illustrating an operation of the control device 50.

The control device 50 monitors the +B power supply 102 during the normal operation of the power steering device 10 (step S1) and determines whether the failing of the +B power supply 102 has been detected (step S2). Details of how to detect and determine the failing of the +B power supply 102 are as described above.

When the control device 50 is not detecting the failing of the +B power supply 102 (step S2; NO), the process returns to step S1. When the control device 50 determines that it has detected the failing of the +B power supply 102 (step S2; YES), the control device 50 determines whether or not the steering handle 12 is held by the driver (step S3). At step at S3, the control device 50 may determine whether or not the steering handle 12 is held, for example, based on the steering torque Tr inputted from the torque sensor 28. Specifically, when tr is larger than a preset threshold, the control device 50 determines that the steering handle 12 is held. In this case, the torque sensor 28 corresponds to an example of a detection unit.

Alternatively, the steering handle 12 may be configured to have a sensor to detect whether the driver is holding the steering handle 12. For this sensor, for example, a piezoelectric sensor or a capacitance sensor is used, and this sensor corresponds to an example of a detection unit. The sensor of the steering handle 12 outputs detection values to the control device 50. In this case, the control device 50 can determine whether or not the steering handle 12 is held, based on the detection values of the sensor provided to the steering handle 12.

In the case in which the steering handle 12 is held, what is called, in the case of hands-on (step S3; YES), the control device 50 ends this process.

In the case in which the steering handle 12 is not held (step S3; NO), the control device 50 starts the three-phase short-circuit control to generate an electromagnetic brake (step S4). The control device 50 also outputs an alarm (step S5).

As illustrated in FIG. 1, the control device 50 is connected to a monitor 90. The monitor 90 is a display device mounted on the vehicle. The monitor 90 may be an in-vehicle device such as a display-audio device (DA) or a car-navigation device. Alternatively, the monitor 90 may be a display unit of the vehicle such as a meter panel. The control device 50 and the monitor 90 are connected with each other by using a communication cable or wireless communication; for example, they are connected by the Controller Area Network (CAN).

The control device 50 can output a control signal CS to the monitor 90 to display text and images on the monitor 90.

At step S5 in FIG. 4, the control device 50 outputs the control signal CS to the monitor 90 to display a notification or an alarm including a description to make a notification that the main power supply of the power steering device 10 has failed and a description to prompt holding the steering handle 12.

The monitor 90 is shown as an example of an output device that is connected to the control device 50 and capable of outputting information to the driver. The control device 50 can be connected not only to the monitor 90 but to various output devices mounted on the vehicle. The configuration only needs to be one in which the control device 50 operates an output device so that the output device can output a notification or an alarm. For example, the control device 50 may output a notification or an alarm by using voice through a speaker.

The control device 50 determines whether or not the steering handle 12 is held to be operated (step S6). If the steering handle 12 is not held to be operated (step S6; NO), the control device 50 determines whether the time elapsed since the three-phase short-circuit control ST2 was started has reached the set time T2 (step S7). If it has not reached the set time T2 (step S7; NO), the control device 50 returns to step S6.

If the steering handle 12 is held to be operated (step S6; YES), and the set time T2 has been reached (step S7; YES), the control device 50 ends the three-phase short-circuit control ST2, releases the electromagnetic brake (step S8), and ends this process.

5. Other Embodiments

The above embodiment is to illustrate a specific example to which the present invention is applied and hence does not intend to limit the configuration to which the invention is applied.

The control device 50 may be hardware programed to perform the operation illustrated in FIG. 4. Alternatively, the control device 50 may execute the operation in FIG. 4 by using functions of programs. In this case, the control device 50 may execute the operation in FIG. 4 by using one program or multiple programs.

6. Configurations Supported by Foregoing Embodiment

The foregoing embodiment is a specific example of the configurations described below.

(First Item) An electric power steering device including: a motor; a drive device that supplies the motor with three-phase alternating current electric power; and a control device that controls the drive device, in which the control device is connected to a first power supply path that supplies power to the control device not via an ignition switch and a second power supply path that supplies power to the control device via the ignition switch, and the control device, in a case of detecting a failing of the first power supply path, operates with power supplied from the second power supply path and makes the motor generate an electromagnetic brake.

With the electric power steering device of the first item, in the case in which an abnormal event that causes the first power supply path to fail occurs, it is possible to suppress a change in the steering state by supplying power to the control device via the ignition switch to generate an electromagnetic brake. Thus, for example, even in the case in which the power supply of the vehicle fails when the driver is not operating, it is possible to suppress the movement of the vehicle in an unintended direction.

(Second Item) The electric power steering device according to the first item, in which the first power supply path has a circuit that connects the control device to a battery of a vehicle.

With the electric power steering device of the second item, in the case in which the power supplied from the battery of the vehicle to the control device fails, it is possible to supply power to the control device via the ignition switch.

(Third Item) The electric power steering device according to the second item, in which the drive device is connected to the battery of the vehicle together with the circuit of the first power supply path and supplies electric power to the motor, and the control device, in a case of detecting a failing of the first power supply path, short-circuits the motor to generate an electromagnetic brake.

With the electric power steering device of the third item, even in the state in which electric power cannot be supplied from the drive device to the motor along with a failing of the first power supply path, it is possible to generate an electromagnetic brake on the motor.

(Fourth Item) The electric power steering device according to the first item, in which the control device compares supply voltages of the first power supply path and the second power supply path, and when the difference between the supply voltages is larger than or equal to a preset voltage value, the control device detects a failing of the first power supply path.

With the electric power steering device of the fourth item, it is possible to detect accurately that the power supply has failed, by comparing the supply voltages.

(Fifth Item) The electric power steering device according to the first item, in which in a case in which a specified time elapses after the motor generates an electromagnetic brake, the drive device makes the motor release the electromagnetic brake.

The electric power steering device of the fifth item releases the electromagnetic brake after a specified time has elapsed since the electromagnetic brake was generated. This operation suppresses a sudden change in the vehicle orientation that may occur immediately after the power supply fails but does not interfere the steering of the driver in the case in which the driver starts steering to take an action against the failing of the power supply.

(Sixth Item) The electric power steering device according to the first item, further including a detection unit that detects a holding operation to a steering handle, in which in a case in which the control device detects a holding operation to the steering handle while the motor is generating an electromagnetic brake, the control device makes the motor release the electromagnetic brake.

The electric power steering device of the sixth item releases the electromagnetic brake when the steering handle is held. This operation suppresses a sudden change in the vehicle orientation that may occur immediately after the power supply fails but does not interfere the steering of the driver in the case in which the driver starts steering to take an action against the failing of the power supply.

(Seventh Item) The electric power steering device according to the first item, further including a detection unit that detects a holding operation to a steering handle, in which in a case in which the control device detects a failing of the first power supply path in a state in which the control device is detecting a holding operation to the steering handle, the control device does not make the motor generate an electromagnetic brake.

The electric power steering device of the seventh item does not generate an electromagnetic when the driver can operate the steering handle, and thus there is an advantage that the steering performed by the driver to take an action against the failing of the power supply is not interfered.

(Eighth Item) The electric power steering device according to the first item, in which in a case in which the control device detects a failing of the first power supply path, the control device performs notification control to make a notification prompting a holding operation to a steering handle.

With the electric power steering device of the eighth item, it is possible to notify the driver and other passengers that a failing of the power supply has been detected and to prompt the driver to steer.

REFERENCE SIGNS LIST 10 power steering device
12 steering handle
22 motor
28 torque sensor (detection unit)
34 battery
36 inverter (drive device)
38 FET
40 choke coil
42 power supply line
44 capacitor
50 control device
68 regulator
70 first power supply path
80 second power supply path
84u, 84v, 84w arm
86u, 86v, 86w upper arm device
88u, 88v, 88w lower arm device
90 monitor
102 +B power supply
104 IG power supply

What is claimed is:

1. An electric power steering device comprising:
   a motor;
   a drive device that supplies the motor with three-phase alternating current electric power; and
   a control device that includes a processor and controls the drive device, wherein
   the control device is connected to both of: a first power supply path that supplies power from a battery of a vehicle to the control device not via an ignition switch; and a second power supply path that supplies power from the battery of the vehicle to the control device via the ignition switch,
   the control device, in a case of detecting a failing of the first power supply path, operates with power supplied from the second power supply path and makes the motor generate an electromagnetic brake, and
   in a case in which a specified time elapses after the motor generates the electromagnetic brake, the drive device makes the motor release the electromagnetic brake.

2. The electric power steering device according to claim 1, wherein
   the first power supply path has a circuit that connects the control device to the battery of the vehicle.

3. The electric power steering device according to claim 2, wherein
   the drive device is connected to the battery of the vehicle together with the circuit of the first power supply path and supplies electric power to the motor, and
   the control device, in the case of detecting the failing of the first power supply path, short-circuits the motor to generate the electromagnetic brake.

4. The electric power steering device according to claim 1, wherein
   the control device compares supply voltages of the first power supply path and the second power supply path, and when the difference between the supply voltages is larger than or equal to a preset voltage value, the control device detects the failing of the first power supply path.

5. The electric power steering device according to claim 1, wherein
   in the case in which the control device detects the failing of the first power supply path, the control device performs notification control to make a notification prompting a holding operation to a steering handle.

6. An electric power steering device, comprising:
   a motor;
   a drive device that supplies the motor with three-phase alternating current electric power;
   a control device that includes a processor and controls the drive device; and
   a detection unit that is a sensor which detects a holding operation to a steering handle, wherein
   the control device is connected to both of: a first power supply path that supplies power from a battery of a vehicle to the control device not via an ignition switch; and a second power supply path that supplies power from the battery of the vehicle to the control device via the ignition switch,
   the control device, in a case of detecting a failing of the first power supply path, operates with power supplied from the second power supply path and makes the motor generate an electromagnetic brake, and in a case in which the control device detects the holding operation to the steering handle while the motor is generating the electromagnetic brake, the control device makes the motor release the electromagnetic brake.

7. An electric power steering device, comprising:

a motor;

a drive device that supplies the motor with three-phase alternating current electric power;

a control device that includes a processor and controls the drive device; and a detection unit that is a sensor which detects a holding operation to a steering handle, wherein the control device is connected to both of: a first power supply path that supplies power from a battery of a vehicle to the control device not via an ignition switch; and a second power supply path that supplies power from the battery of the vehicle to the control device via the ignition switch, the control device, in a case of detecting a failing of the first power supply path, operates with power supplied from the second power supply path and makes the motor generate an electromagnetic brake, and in a case in which the control device detects the failing of the first power supply path in a state in which the control device is detecting the holding operation to the steering handle, the control device does not make the motor generate the electromagnetic brake.

\* \* \* \* \*